United States Patent [19]

Retallick

[11] Patent Number: 5,406,704
[45] Date of Patent: Apr. 18, 1995

[54] METHOD FOR MAKING AN IGNITION STAGE FOR A HIGH TEMPERATURE COMBUSTOR

[75] Inventor: William B. Retallick, West Chester, Pa.

[73] Assignee: W. R. Grace & Co.-Conn., New York, N.Y.

[21] Appl. No.: 216,941

[22] Filed: Mar. 24, 1994

Related U.S. Application Data

[62] Division of Ser. No. 885,456, May 19, 1992, Pat. No. 5,328,359.

[51] Int. Cl.$^6$ .............................................. B23P 15/00
[52] U.S. Cl. ..................................... 29/890; 29/400.1
[58] Field of Search ............... 29/890, 400.1; 431/7, 431/170, 326; 122/40; 60/723; 502/439, 527

[56] References Cited

U.S. PATENT DOCUMENTS

| | | |
|---|---|---|
| 3,088,271 | 5/1963 | Smith . |
| 3,925,001 | 12/1975 | Salooja . |
| 3,992,330 | 11/1976 | Noakes . |
| 4,008,570 | 2/1977 | Harada . |
| 4,072,007 | 2/1978 | Sanday . |
| 4,375,949 | 3/1983 | Salooja . |
| 4,576,800 | 3/1986 | Retallick ............................. 422/180 |
| 4,711,009 | 12/1987 | Cornelison . |
| 4,725,411 | 2/1988 | Cornelison . |
| 4,753,919 | 6/1988 | Whittenberger . |
| 4,838,067 | 6/1989 | Cornelison . |
| 5,202,303 | 4/1993 | Retallick et al. ..................... 502/439 |

FOREIGN PATENT DOCUMENTS

| | | |
|---|---|---|
| 3341868 | 5/1985 | Germany . |
| 3923094 | 1/1991 | Germany . |
| 57-210207 | 12/1982 | Japan . |
| 61-259013 | 11/1986 | Japan . |
| 61-289220 | 12/1986 | Japan . |
| 92/09365 | 6/1992 | WIPO . |

*Primary Examiner*—Irene Cuda
*Attorney, Agent, or Firm*—Beverly J. Artale

[57] ABSTRACT

A catalytic reactor, used as the ignition stage for a multi-stage combustor, is made by the following method. Alternate sides of a metal strip are first coated with a combustion catalyst, in such a manner that at any point on the strip, one side is coated and the other side is not coated. Then the strip is folded back and forth upon itself in a zigzag pattern, to produce the reactor. The strip has corrugations which keep adjacent portions of the strip spaced apart when the strip has been folded. The reactor made by this method has an extended useful life, in part because it does not become so hot that the catalyst becomes deactivated.

7 Claims, 4 Drawing Sheets

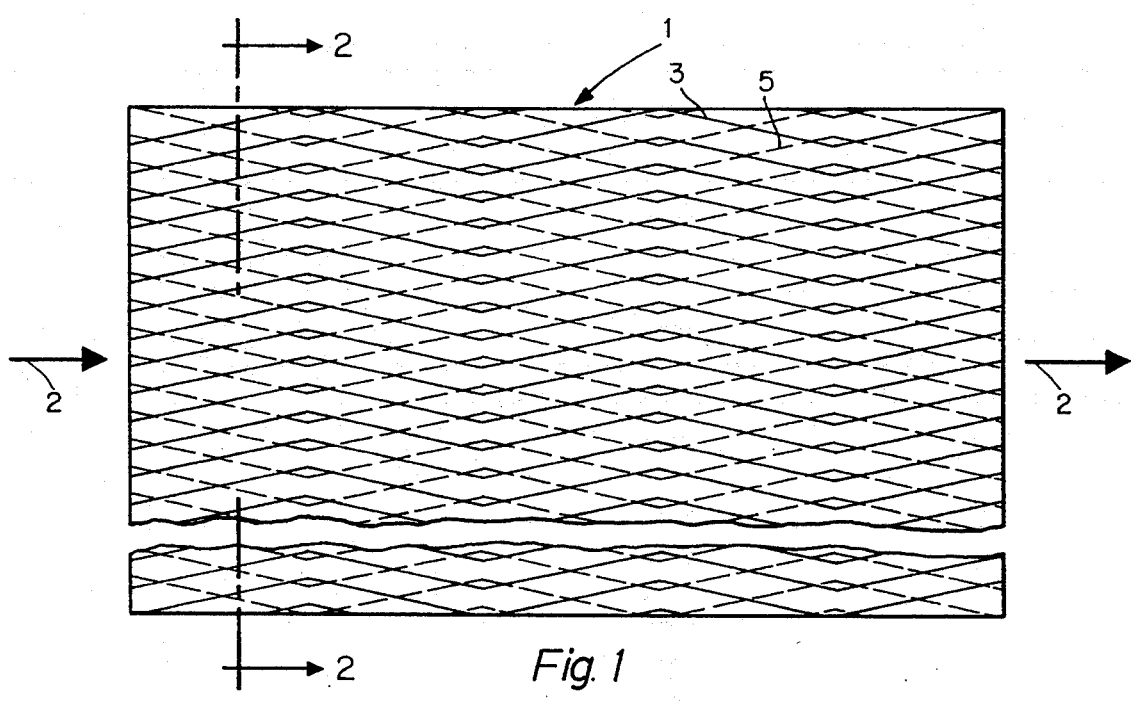
Fig. 1
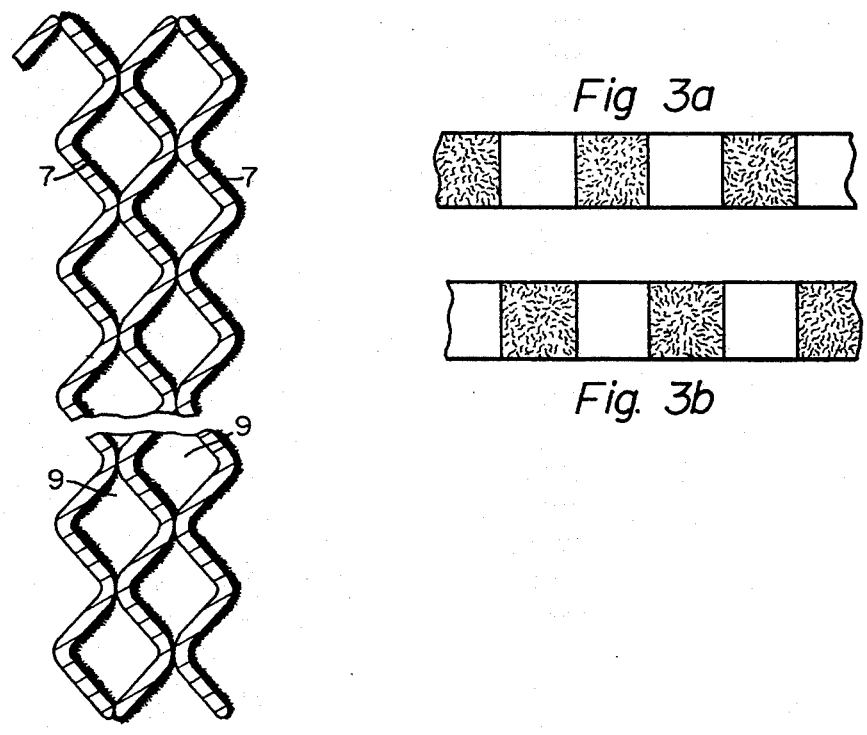
Fig. 2
Fig. 3a
Fig. 3b

METHOD FOR MAKING AN IGNITION STAGE FOR A HIGH TEMPERATURE COMBUSTOR

This is a division of application Ser. No. 07/885,456, filed May 19, 1992, now U.S. Pat. No. 5,328,359.

BACKGROUND OF THE INVENTION

The present invention provides a combustion apparatus for use in a high-temperature environment, such as in a gas turbine, or elsewhere. More particularly, the invention includes a catalytic combustor which one can use as the initial stage in a multi-stage high-temperature combustion apparatus.

The present invention represents an improvement over the product and method described in copending U.S. patent application Ser. No. 07/408,521, filed Sep. 18, 1989, entitled "Combustion Apparatus for High-temperature Environment". This specification hereby incorporates the disclosure of the latter application by reference.

When a fuel-air mixture flows through the channels of a catalytic reactor, the temperature of the mixture increases smoothly as the combustion proceeds. But the temperature of the catalyst-coated wall of the channel does not increase smoothly. Instead, this temperature increases rapidly near the entrance to the channel and approaches the adiabatic combustion temperature. Then it remains close to the adiabatic combustion temperature over the length of the channel.

If one makes the channel too short to achieve complete combustion, the exiting gas will have a temperature below the adiabatic combustion temperature. Even so, the catalyst-coated wall will have a temperature close to adiabatic, over all but the front end of the channel. Thus, even with a shortened catalytic combustion channel, the catalyst-coated walls still reach the adiabatic temperature, thereby deactivating the catalyst.

The above-cited patent application discloses one solution to the above problem. The latter application shows a catalytic reactor made of a single strip of metal coated with catalyst on one side only. One embodiment includes a strip folded back and forth upon itself, in a zigzag pattern, to form a catalytic reactor. In another embodiment, either one or two strips become wound into a spiral. In either case, the catalytic reactor defines channels for gas flow in which a catalyst coats either all or none of each channel.

The present invention provides a modified structure which more evenly distributes the coated and uncoated portions of the metal strip. The invention also includes a method for making a catalytic reactor. The present invention prevents the walls of the combustor from reaching the adiabatic combustion temperature, as compared with catalytic combustors of the prior art.

SUMMARY OF THE INVENTION

The present invention includes a structure for the ignition stage of a multiple-stage combustion apparatus. One forms this ignition stage from one or more strips of metal, preferably having the thickness of a foil. The foil contains corrugations, the corrugations preferably defining a herringbone or "chevron" pattern. Multiple layers of corrugated foil form a structure called a honeycomb. The corrugations in adjacent layers cross over each other and prevent the layers from nesting together. The corrugations also form channels for gas flow.

An important feature of the present invention comprises coating just one wall of each channel with catalyst. The other wall remains uncoated. At any point on a wall of a channel, both sides of the foil can transfer heat to the gas stream. But only the coated side can combust fuel and generate heat. Therefore the temperature of the foil will settle at a temperature below the adiabatic combustion temperature, and the catalyst does not become deactivated.

One embodiment of the invention includes two strips of foil, both coated with catalyst on only one side. One winds these strips together to form a continuous spiral channel. Only one wall of the channel has a catalyst coating.

Another embodiment of the invention includes a plurality of separate strips of metal. One stacks the strips to define channels that contain a catalyst coating on only one wall of each channel.

Still another embodiment includes a reactor made from a single strip of metal. The strip contains bands of catalyst coating on both sides of the strip. The end of a band on one side marks the beginning of a band on the other side. In other words, at any given point on the strip, the strip has a catalyst coating on one side but not the other. One folds the strip back and forth upon itself, in a zigzag pattern, to form the catalytic reactor. The present invention includes various ways of varying the arrangement of the bands and/or the fold lines. All such variations include a strip having a catalyst coating distributed along the strip, to prevent the strip from overheating.

The present invention therefore has the principal object of providing a catalytic combustion apparatus for use in a high-temperature environment.

The invention has the further object of providing a method for making a catalytic combustion apparatus for use in a high-temperature environment.

The invention has the further object of providing a method for making a catalytic ignition stage which does not become so hot that its metal catalyst becomes deactivated.

The invention has the further object of extending the useful life of a catalytic reactor.

The invention has the further object of making it more practical to use a catalytic reactor in a high-temperature environment.

Those skilled in the art will recognize other objects and advantages of the present invention, from a reading of the following brief description of the drawings, the detailed description of the invention, and the appended claims.

BRIEF DESCRIPTION OF THE DRAWINGS

FIG. 1 shows a partially fragmentary plan view of the top two layers of a stack of metal strips, each strip having corrugations forming a herringbone pattern, the stack of strips forming the ignition stage of a combustion apparatus made according to the present invention.

FIG. 2 provides a cross-sectional view taken along the line 2—2 of FIG. 1, and shows the channels formed by the layers of metal strips.

FIGS. 3a and 3b show plan views of both sides of a single metal strip, used to make a catalytic reactor according to another embodiment of the present invention. The strip contains bands of coated and uncoated regions, and at every point along the strip, either one side or the other (but not both) has a catalyst coating.

DETAILED DESCRIPTION OF THE INVENTION

Figure 4:
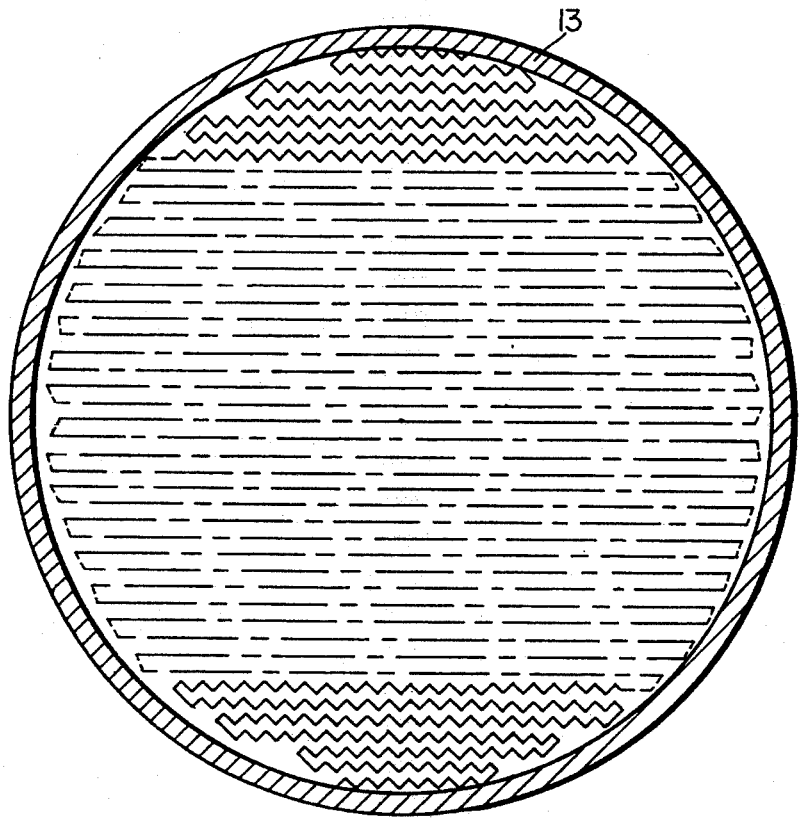
FIG. 4 provides a fragmentary end view of a catalytic reactor made according to the present invention, wherein one has folded a metal strip back and forth upon itself to define a generally circular cross-section.

The present invention comprises a multiple-stage combustion apparatus for use in a high-temperature environment, and a method for making the apparatus. One designates the first stage as the ignition stage. The ignition stage employs a combustion catalyst, such as a metal from the platinum group, which ignites the incoming fuel-air mixture. This ignition stage must burn the fuel-air mixture only partly, so that the temperature of the gas leaving the first stage of the combustion apparatus does not exceed about 1500° F. This specification uses the term "ignition stage" synonymously with "catalytic combustor" or "catalytic reactor".

Copending application Ser. No. 07/408,521, cited above, discloses a construction that ensures that the first stage only partly burns the fuel-air mixture. In the cited application, alternate channels in the honeycomb combustor bear a catalyst coating. The channels containing the coating have the coating on both walls of the channel. The channels having no coating bear no catalyst on either wall. The uncombusted fuel-air mixture flowing through the uncoated channels cools the walls of the coated channels.

The major difference between the present invention and the combustor shown in the cited patent application resides in the manner of coating the channels.

FIG. 1 shows catalytic ignition stage 1 formed of metal having herringbone, or "chevron", corrugations. Although this figure resembles FIG. 1 of the above-cited application, it represents a different structure, insofar as FIG. 1 of the present invention indicates a stack of corrugated strips, and not a single strip folded back and forth upon itself. Preferably, one makes the strips from a foil, but the invention can work with strips of considerably greater thicknesses. One first corrugates each strip and then coats the strip with catalyst on only one side. One stacks these strips in layers to form the catalytic ignition stage of the present invention.

FIG. 1 shows the top layer in full and the next layer in phantom. Reference numeral 3 indicates the corrugations in the top layer, and reference numeral 5 indicates the corrugations in the next preceding layer. Because the corrugations in adjacent layers have a generally out-of-phase relationship, the layers do not nest together. Thus, the corrugations provide means for maintaining at least a portion of the strip in spaced apart relation relative to an adjacent strip. Arrows 2 indicate the general direction of gas flow.

FIG. 2 provides a cross-sectional view taken along the line 2—2 of FIG. 1, showing the channels formed by the stack of strips. FIG. 2 shows clearly that each strip has a catalyst coating 7 on only one side. The folded strip defines channels 9. Each channel comprises two walls, one wall bearing a catalyst coating and the other wall remaining uncoated. Thus, in the embodiment of FIGS. 1 and 2, half of each channel bears a catalyst coating, and the other half remains uncoated. In the view of FIG. 2, gas flows in a direction perpendicular to the paper. Thus, about half of the gas encounters a coated wall and the remainder encounters an uncoated wall.

Note also that the combustion gas flows through zigzag channels defined by the herringbone corrugations, as shown in FIG. 1. Thus, the gas almost never flows exactly parallel to arrows 2; the arrows show only the general direction of gas flow.

The zigzag path has the advantage of providing better heat and mass transfer. By definition, the length of a zigzag path connecting two points exceeds that of a straight path connecting those points. Thus, with the zigzag path, the gas has more opportunity to contact the reactive walls of the channels, and more opportunity to transfer heat. Thus, one can achieve the same ignition effect with a shorter length of catalyst. The zigzag path can thus reduce the amount of catalyst required.

Note also that FIG. 2 provides a picture of the strips only along the particular line 2—2 of FIG. 1. If one had taken the cross-section at another point, the corrugations would have a different relative "phase". Due to the herringbone configuration, the adjacent layers will not nest together.

Note also that the combustion gas, while traveling in the general direction indicated by arrows 2, can still traverse the width of the reactor, in a direction generally perpendicular to the direction of gas flow, at most (but not necessarily all) locations. This transverse flow of gas also has advantages. At the expense of some pressure drop, it also provides a higher rate of mass transfer, which further enhances the efficiency of the ignition stage.

In another embodiment of the present invention, one forms the catalytic ignition stage from a single metal strip. In this embodiment, the strip contains bands of catalyst coating on both sides of the strip. FIGS. 3a and 3b illustrate such a strip. FIG. 3a represents one side of the strip and FIG. 3b represents the opposite side. Thus, at any point along the strip, one side of the strip bears a catalyst coating, while the other side remains bare. In FIGS. 3a and 3b, the coated and uncoated bands have the same lengths, but one can also vary the lengths of the bands. The term "length", as used with respect to the bands, refers to the dimension of the band as measured along the length of the strip.

One uses a strip prepared as indicated in FIGS. 3a and 3b to make the catalytic ignition stage shown in FIG. 4. Specifically, one folds the strip back and forth upon itself in a zigzag manner. FIG. 4 shows a strip folded back and forth to define a generally circular cross-section, and encased within canister 13. FIG. 4 shows only some of the layers, but does not explicitly show the catalyst coating. One can form many other shapes by folding the strip back and forth upon itself, in the manner shown in U.S. Pat. Nos. 4,576,800 and 4,838,067. This specification incorporates by reference the disclosures of the latter patents.

By varying the lengths of the coated and uncoated bands in FIGS. 3a and 3b, one can make final products having very different patterns of catalyst coating. FIGS. 5–10 provide examples. These figures show fragmentary cross-sectional views of several folds of a strip, similar to the view of FIG. 2. However, note that FIGS. 5–10 differ from FIG. 2 in that each strip in FIGS. 5–10 constitutes a single piece, folded back and forth upon itself, while the structure of FIG. 2 comprises a plurality of separate stacked strips.

Figure 5:
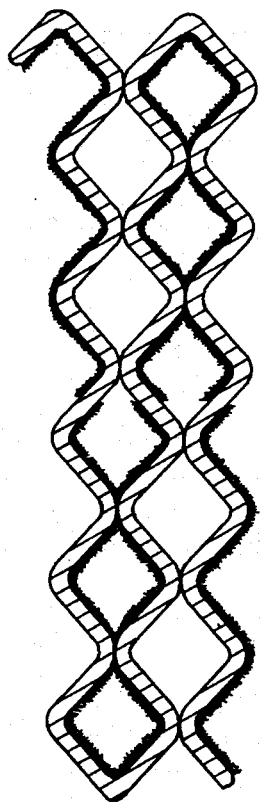
FIG. 5 provides a fragmentary end view of a single folded metal strip, wherein one has folded the strip along the middle of a band of catalyst coating, and wherein the interval between folds equals the length of one of the bands.
Figure 6:
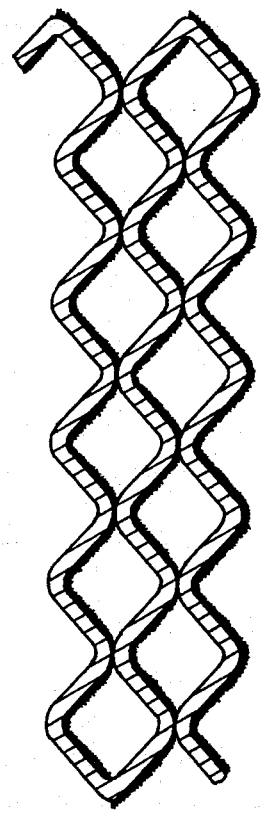
FIG. 6 provides a view similar to that of FIG. 5, but wherein one has folded the strip along the edge of a band.
Figure 7:
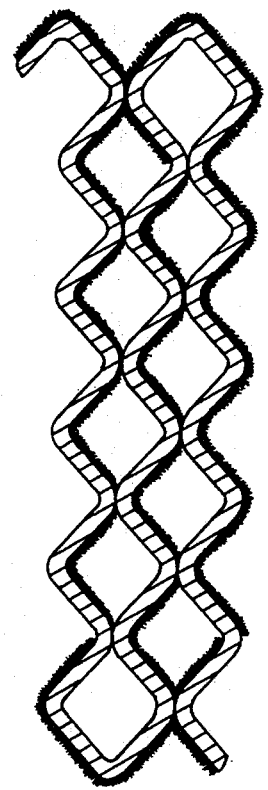
FIG. 7 provides a view similar to that of FIG. 5, but wherein one has folded the strip at a point between the middle of a band and the edge of a band.

The two major parameters which one must consider in making a catalytic ignition stage from the strip of FIG. 3 include the placement of the fold lines and the distance between fold lines. FIGS. 5–7 illustrate three cases in which the interval between folds equals one band width (assuming that the bands have equal lengths). Thus, in FIG. 5, one has placed the fold lines in the middle of each band. In FIG. 6, one has placed the fold lines at the edges of the bands. In FIG. 7, one locates the fold line at a point intermediate the middle and the edge of the band.

Figure 8:
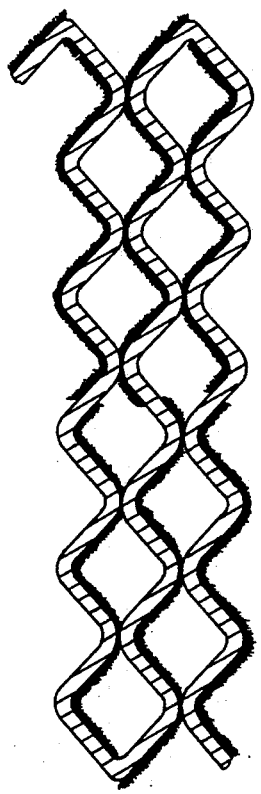
FIG. 8 provides a view similar to that of FIG. 5, wherein one has folded the strip along the edge of a band, and where the interval between folds equals twice the length of one of the bands.

FIG. 8 illustrates a case in which the distance between folds equals two band widths. One has located the fold line at the edge of the band.

Figure 9:
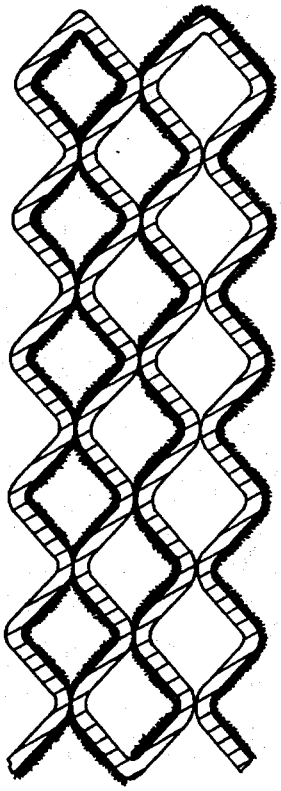
FIG. 9 provides a view similar to that of FIG. 5, but wherein the interval between folds equals one-half the length of one of the bands.

FIG. 9 illustrates a case in which the distance between folds equals one-half the width of the band. In this case, the fold lines appear at the edges and/or the middle of the bands; if fold lines appear at edges, other fold lines must appear at the middle.

Figure 10:
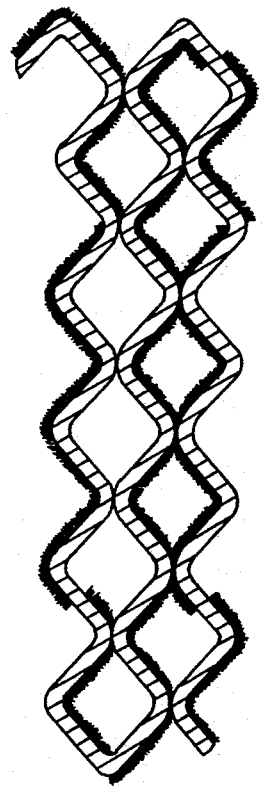
FIG. 10 provides a view similar to that of FIG. 5, but wherein the bands of catalyst coating have varying lengths.

FIG. 10 illustrates a case in which the bands have variable lengths.

The reader will easily recognize that the cases described above do not exhaust all possibilities. One can construct many other arrangements by varying the band width and/or the position of the fold lines and/or the interval between folds. Thus, some channels may have catalyst coating on one of two walls. Other channels may have catalyst coating on parts of both walls. Some channels may have catalyst coating on both of two walls or neither of the two walls. In particular, one can make the structure of FIG. 4 wherein every channel includes one fully coated wall and one fully bare wall, by varying the widths of the bands at the appropriate places, in a manner analogous to the method of locating perforations in a strip in U.S. Pat. No. 4,576,800. Or one can build FIG. 4 wherein varying portions of each layer of the folded strip contain catalyst. The present invention includes all such possibilities. All of the possible arrangements have one feature in common, namely that every part of the strip contains a catalyst coating on exactly one side.

Figure 11:
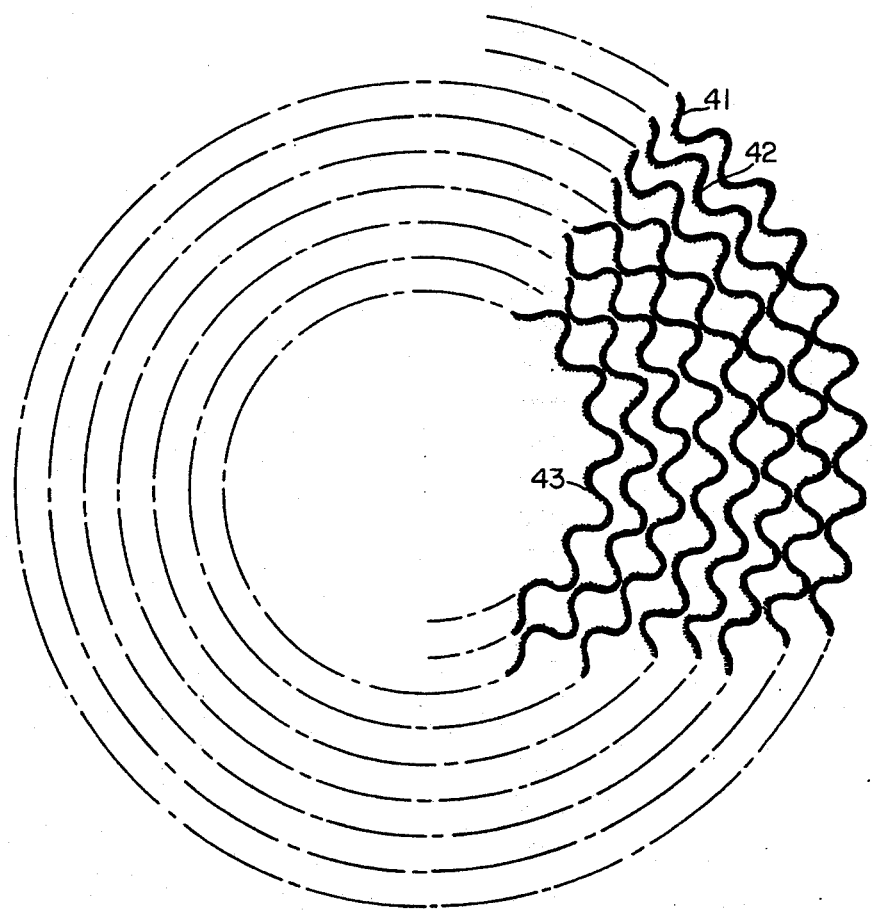
FIG. 11 shows a fragmentary end view of a catalytic reactor made according to an embodiment of the present invention which includes two strips of metal wound into a spiral.

FIG. 11 shows another embodiment of the present invention. This embodiment comprises two strips 41 and 42 wound into a spiral. Both strips have a catalyst coating 43 on only one side. Before winding the strips to form the spiral of FIG. 11, one must first arrange the strips so that the coated sides do not face each other. In other words, the coated side of one strip faces the uncoated side of the other strip, and vice versa. Then, when wound, the strips define channels having walls, only one of which bears a catalyst coating.

Alternatively, one can form strips 41 and 42 from a single strip by coating the strip on one side from the end of the strip to its midpoint, and by coating the other half of the strip from the midpoint to the other end, on the other side of the strip. Then, one folds the strip upon itself about a point near its midpoint, and winds the strip into a spiral. One obtains a structure almost identical to that obtained from separate strips, except that in this alternative embodiment a piece of metal joins the two strips at their ends. Thus, one should consider this alternative a direct equivalent of the embodiment discussed earlier.

In another embodiment, instead of using strips fully coated on one side, one or both of the strips have bands of catalyst coating, formed in the same manner described with respect to FIGS. 3a and 3b. In the most general case, the bands need not have uniform lengths. One can form the bands with random lengths. Thus, in this embodiment, one can achieve a random distribution of catalyst throughout the spiral.

As shown above, the present invention includes embodiments wherein exactly one wall of every channel has a catalyst coating, while the other wall remains uncoated. In these embodiments, at any point on a wall of a channel, both sides of the metal foil can transfer heat to the gas stream, but only the coated side can combust fuel and generate heat. Therefore the temperature of the foil will not rise to the adiabatic combustion temperature at only a short distance from the inlet. If the channels have sufficient length, combustion reaches completion, and the foil near the output end of the ignition stage will reach adiabatic temperature.

Figure 12:
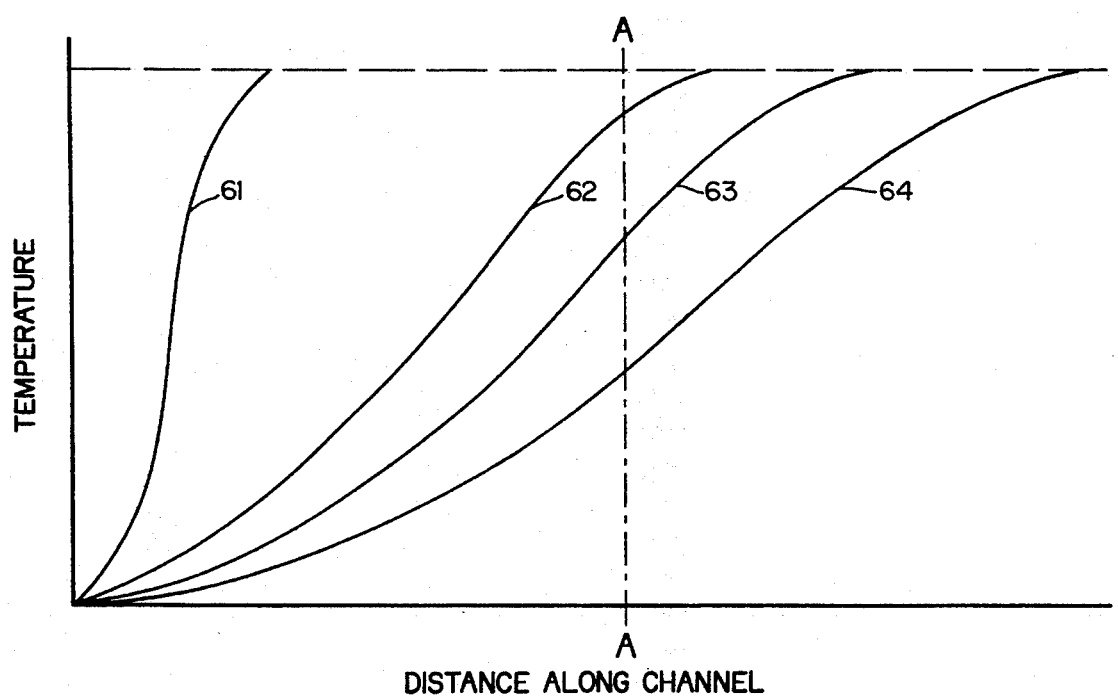
FIG. 12 provides a graph showing temperature profiles of the metal strip and of the gas stream in a catalytic combustor.

FIG. 12 illustrates the relationship between temperature and distance along a channel for the catalytic ignition stage of the present invention as well as for those of the prior art. Curve 61 represents the temperature of the metal strip (foil) in a reactor wherein all of the walls bear a catalyst coating. As shown, the temperature reaches the adiabatic temperature at a short distance from the inlet. Curve 62 traces the temperature of the gas stream in this same reactor. This temperature rises smoothly and reaches adiabatic temperature further downstream. Curve 63 traces the temperature of the metal strip in a reactor of the present invention. The temperature rises more slowly, but if the channels have sufficient length, the foil will reach adiabatic temperature. Curve 64 traces the temperature of the gas stream in a reactor of the present invention. Here also, the gas reaches adiabatic temperature if the channels have sufficient length. In a reactor of the present invention, one makes the channels short enough to prevent attainment of adiabatic temperature, either on the metal strip or in the gas stream. To accomplish this objective, one cuts off the reactor of the present invention at the position indicated generally by line A—A. Combustion in the gas stream will not reach completion, and neither the foil nor the gas stream have reached adiabatic temperature.

U.S. Pat. No. 4,711,009, also incorporated by reference into this specification, describes a continuous process for corrugating a metal strip, coating the strip with catalyst, and folding the strip upon itself to form a honeycomb. In the process of the latter patent, one coats the strip with catalyst on both sides, as shown in FIG. 8 of that patent. In practicing the present invention, one must modify the process of latter patent to apply the catalyst coating only in the desired locations. For the embodiment of FIGS. 1 and 2, which includes a stack of individual corrugated strips, or the embodiment of FIG. 11, which includes a spiral formed of two such strips, one simply applies the coating to only one side of each strip, by spraying the strip on only one side, or by applying the coating with a roller contacting one side of the strip. One wets the roller with the washcoat or with a solution of the catalyst metal.

For the embodiments which use a strip of the type shown in FIGS. 3a and 3b, one needs to modify the process of U.S. Pat. No. 4,711,009 in a different way. One could spray a washcoat and/or catalyst on either side of the strip by alternately activating nozzles disposed on either side of the strip. Alternatively, one could apply the washcoat and/or catalyst from only one side of the strip, and could either pass the strip twice through the line, or pass the strip through two similar processing areas, using equipment programmed to apply a coating to the different sides of the strip in the proper locations.

Note that, for clarity of illustration, FIGS. 1 and 2 do not show the canister that encloses the stack of strips, and FIG. 11 also does not show a canister. In practice, one would use such a canister. FIG. 4 explicitly shows a canister.

While the specification describes the invention with respect to certain embodiments and examples, the reader skilled in the art will recognize many possible variations. One should consider such variations within the spirit and scope of the following claims.

What is claimed is:

1. A method of making a catalytic reactor, the method comprising the steps of:
    a) coating alternate sides of a strip of metal with a catalyst, the strip having means for maintaining at least a portion of the strip in spaced apart relation from another portion of the strip when said portions are arranged adjacent to each other, the coating being performed such that at any point on the strip, one side of the strip is coated with catalyst and the other side is not coated, and
    b) folding the strip back and forth upon itself in a zigzag pattern, to produce the reactor.

2. The method of claim 1, further comprising the step of enclosing the folded strip within a canister.

3. The method of claim 1, wherein the coating is applied to the strip in bands of coated and uncoated regions, the bands extending across the entire width of the strip, and wherein the bands have equal lengths.

4. The method of claim 3, wherein the folding is done along lines coincident with the edges of the bands.

5. The method of claim 3, wherein the folding is done along lines which are not at the edges of the bands.

6. The method of claim 3, wherein the distance between folds is in the range of one-half to two times the length of a band.

7. The method of claim 1, wherein the coating is applied to the strip in bands of coated and uncoated regions, the bands extending across the entire width of the strip, and wherein the bands have unequal lengths.

* * * * *